United States Patent
Roba et al.

(10) Patent No.: US 7,441,416 B2
(45) Date of Patent: Oct. 28, 2008

(54) METHOD FOR MANUFACTURING OPTICAL FIBRE PREFORMS

(75) Inventors: Giacomo Stefano Roba, Monza (IT); Massimo Nutini, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 532 days.

(21) Appl. No.: 10/450,918

(22) PCT Filed: Nov. 30, 2001

(86) PCT No.: PCT/EP01/14016

§ 371 (c)(1), (2), (4) Date: Nov. 26, 2003

(87) PCT Pub. No.: WO02/49975

PCT Pub. Date: Jun. 27, 2002

(65) Prior Publication Data

US 2004/0112091 A1    Jun. 17, 2004

Related U.S. Application Data (60) Provisional application No. 60/256,942, filed on Dec. 21, 2000.

(30) Foreign Application Priority Data

Dec. 19, 2000    (EP) .................................. 00127851

(51) Int. Cl.
*C03B 37/018*    (2006.01)
(52) U.S. Cl. .............................. 65/414; 65/17.4; 65/531
(58) Field of Classification Search .................... 65/420, 65/120, 17.4, 414, 385, 413, 531, 421
See application file for complete search history.

(56) References Cited

U.S. PATENT DOCUMENTS

| 4,345,928 A |   | 8/1982 | Kawachi et al. |
|---|---|---|---|
| 4,388,098 A | * | 6/1983 | Takahashi et al. ............. 65/157 |
| 4,465,708 A |   | 8/1984 | Fanucci et al. |

(Continued)

FOREIGN PATENT DOCUMENTS

EP    0 204 461 A2    12/1986

(Continued)

OTHER PUBLICATIONS

T. Masahiro; "Production of Glass Fine Particle Body"; Patent Abstracts of Japan, of JP 02-164733 A, Jun. 25, 1990.

(Continued)

*Primary Examiner*—Carlos Lopez
(74) *Attorney, Agent, or Firm*—Finnegan, Henderson, Farabow, Garrett & Dunner, L.L.P.

(57) ABSTRACT

Multi-flame burner wherein each flame is separated with respect to the neighboring flame by at least one separating tube made of a heat resistant material, for example, quartz glass or ceramic material. The burner also has a plurality of co-axial pipes, preferably made of a metallic material. The cross section of the upper end of the separating tube can be modified in order to increase the deposition rate of the burner. Methods for manufacturing optical fibre preforms by vapour deposition using the multi-flame deposition burners.

5 Claims, 7 Drawing Sheets

U.S. PATENT DOCUMENTS

| | | | |
|---|---|---|---|
| 4,474,593 | A | 10/1984 | Andrejco et al. |
| 4,618,354 | A | 10/1986 | Suda et al. |
| 4,661,140 | A | 4/1987 | Takimoto et al. |
| 4,801,322 | A | 1/1989 | Suda et al. |
| 4,810,189 | A | 3/1989 | Mikami et al. |
| 4,826,520 | A | 5/1989 | Kawazoe et al. |
| 5,043,002 | A | 8/1991 | Dobbins et al. |

FOREIGN PATENT DOCUMENTS

| | | |
|---|---|---|
| EP | 1 016 635 A1 | 7/2000 |

OTHER PUBLICATIONS

M. Masao; "Production of Dispersion Shift Fiber Preform"; Patent Abstracts of Japan, of JP 06-199534 A, Jul. 19, 1994.

T. Masahiro; "Production of Fine Glass Particle-Deposited Body"; Patent Abstracts of Japan, of JP 02-133331 A, May 22, 1990.

N. Motohiro; "Burner for Producing Optical Fiber Preform"; Patent Abstracts of Japan, of JP 04-228443 A, Aug. 18, 1992.

T. Masahiro; "Production of Vitreous Fine Granule Accumulation"; Patent Abstracts of Japan, of JP 02-275725 A, Nov. 9, 1990.

Bird; "Transport Phenomena"; Wiley & Sons, New York, pp. 246, 247, 502, 503, and 568-573 (1960).

Kuo; "Principles of Combustion"; Wiley & Sons, New York, pp. 366-371, (1986).

Incropera et al.; "Fundamentals of Heat and Mass Transfer"; Wiley & Sons, 3rd Edition, New York, (1996).

\* cited by examiner

METHOD FOR MANUFACTURING OPTICAL FIBRE PREFORMS

CROSS REFERENCE TO RELATED APPLICATIONS

This application is a national phase application based on PCT/EP01/14016, filed Nov. 30, 2001, the content of which is incorporated herein by reference, and claims the priority of European Patent Application No. 00127851.4, filed Dec. 19, 2000, and claims the benefit of U.S. Provisional Application No. 60/256,942, filed Dec. 21, 2000.

BACKGROUND OF THE INVENTION

1. Field of the Invention

The present invention relates to a burner for manufacturing an optical fiber preform used to make optical glass fibers and to a method for producing said optical, preforms.

In particular, the present invention relates to a multi-flame deposition burner suitable for manufacturing optical preforms in an efficient and stable manner at high fabrication rate and to a method for producing an optical preform by using said burner.

2. Background Art

Glass fibers for optical communication are made from high purity, silica-based glass fibers drawn from glass preforms, which preforms are produced according to various glass deposition techniques.

Some of these deposition techniques, including vapor axial deposition (VAD) and outside vapor deposition (OVD), are based on flame combustion wherein reactants (i.e. silica precursors, such as $SiCl_4$, optionally together with dopants materials, such as $GeCl_4$, for suitably modifying the refractive index of the glass) are fed together with combusting gases through a deposition burner which directs a high temperature flow of forming fine glass particles onto a rotating growing target preform.

According to the VAD deposition technique, the growth of the preform takes place in an axial direction. Thus, the deposition burner(s) is typically maintained in a substantially fixed position, while the rotating preform is slowly moved upwardly (or downwardly) with respect to the burner, in order to cause the axial growth of the preform. Alternatively, the rotating preform can be maintained in a substantially fixed position, while the deposition burner is slowly moved downwardly (or upwardly) with respect to the preform.

Differently from the VAD technique, in the OVD technique the growth of the preform takes place in a radial direction. In this case, a rotating target (e.g. a quartz glass rod) is generally positioned in a fixed horizontal or vertical position and the deposition burner is repeatedly passed along the surface of the growing preform for causing the radial growth of the same.

Independently from the applied deposition technique, a porous glass preform is thus fabricated, which is then consolidated to form a solid glass preform apt for being subsequently drawn into an optical fiber.

Typically, an optical preform comprises a central portion (core) and an outer portion (cladding), the core and the cladding differing in their respective chemical composition and having thus different refractive indexes. As in the optical fibers, the cladding portion forms the majority of the preform. The preform is typically manufactured by producing and consolidating a first preform comprising the core and a first portion of the cladding. An overcladding layer is then deposited onto said first preform, thus obtaining a porous preform, which is then consolidated into the final preform.

In general, conventional burners for manufacturing optical preforms are made up of a plurality of co-axial pipes through which the glass precursor materials (i.e. silica precursors, such as $SiCl_4$, optionally together with dopants materials, such as $GeCl_4$), the combusting gases (e.g. oxygen and hydrogen or methane) and, optionally, some inert gas (e.g. argon or helium) are fed. Typically, the glass precursor material is fed through the central pipe of the burner, while other gases are fed through the annular openings formed by the concentrically disposed pipes.

Examples of such conventional burners are disclosed, for instance, in U.S. Pat. Nos. 4,345,928, 4,465,708, 4,474,593, 4,661,140, and 4,810,189.

"Multi-flame" burners, generating a plurality of independent flames disposed concentrically one to each other, are also disclosed. For instance, U.S. Pat. No. 4,801,322 discloses a multi-flame burner wherein the inner flame, including a glass precursor material, is positioned rearwardly of the outer flame. As mentioned in said patent, the outer flame allows to increase the flame length with consequent size increase of the synthesised glass particles.

U.S. Pat. No. 4,826,520 discloses a modified multi-flame burner for producing doped optical preforms wherein a central pipe, through which a doping reactant ($GeCl_4$) is fed, is spaced forwardly with respect to the other pipes forming the inner flame, in order to reduce the staying time of the doping material inside the flame.

Although few prior art documents disclose burner having pipes made from a heat resistant metallic cylindrical material (e.g. U.S. Pat. No. 4,661,140), the pipes of conventional prior art burners are generally and more desirably made from quartz glass or ceramic materials, as disclosed for instance in U.S. Pat. No. 4,345,928 (col. 8, lines 52-55), U.S. Pat. No. 4,474,593 (col. 2, lines 16-19), U.S. Pat. No. 4,465,708 (col. 1, lines 58-61), U.S. Pat. No. 4,801,322 (col. 26, lines 32-40) and U.S. Pat. No. 4,810,189 (col. 4, lines 66-68).

As a matter of fact, quartz or ceramic materials are more heat resistant than metallic materials to high temperatures and may thus more easily withstand the typical temperature developed by the flame in the burner. In any case, the possible use of heat resistant metallic pipes in conventional deposition burner is necessarily limited to the single-flame type burners (such as the one disclosed in U.S. Pat. No. 4,661,140). In these burners, all the co-axial pipes through which reactants/inert gases flow have in fact substantially the same length; the overheating of said pipes is thus avoided by maintaining the flame sufficiently spaced apart from the tips of the pipes.

However, as observed by the Applicant, in the multi-flame burners of the prior art, such as the one disclosed in U.S. Pat. No. 4,801,322, problems may arise in using metallic materials for manufacturing the pipes of the burner. In fact, as disclosed in the above cited patent, the pipes generating outer flame are longer than the pipes generating the inner flame, in order to obtain the rearward spacing of the inner flame with respect to the outer flame. Thus, the inner surface of the pipes forming the outer flame is subjected to the heat generated by the inner flame. While the typical temperature of a flame is of about 2500-3000° C., the surface of the pipes exposed to the flame may reach a temperature of several hundreds degrees, typically of about 600-800° C. As it is apparent that a pipe made from a metallic material can not withstand the heat generated by such a flame, it is therefore necessary, as mentioned in the above cited patent, to use a burner with quartz glass pipes. This problem is much more evident for burners specifically designed for the outer cladding deposition, which produce larger flames and accordingly higher amount of heat.

The Applicant has however observed that the use of quartz glass or ceramic materials for producing a burner results in a number of drawbacks. In particular, the concentricity of glass pipes is rather cumbersome to obtain and particular attention shall be paid to the relative alignment of the co-axial pipes. In addition, a burner containing a plurality of glass pipes shall be handled with care for avoiding possible damages of the pipes.

The Applicant has now found that in a multi-flame burner, comprising at least an inner section comprising a first plurality of ducts for generating an inner flame and at least an outer section comprising a second plurality of ducts for generating an outer flame surrounding said inner flame, said inner flame can be advantageously confined and separated from the outer flame by disposing a separating tube made of a heat resistant material, in particular of quartz glass or ceramic material (e.g. alumina), between said inner and said outer section.

According to such a burner design, the pipes forming the ducts of the multi-flame burner may thus advantageously be made from a metallic material, e.g. stainless steel.

In addition, as observed by the Applicant, while the burners for depositing the core and the inner cladding of the preform are generally of reduced dimensions, the burner used for depositing the overcladding, in particular for large dimensions preforms, shall be relatively larger, in order to allow the generation of higher flow rates which are necessary for increasing the amount of deposited material, maintaining at the same time the velocity of the gases relatively low.

The Applicant has thus observed that, particularly for overcladding deposition and especially when manufacturing large diameter optical preforms, the deposition rate of the process can be increased by suitably modifying the geometry of deposition burner in order to redistribute the flow of fine glass particles impacting onto the target preform. In particular, it has been observed that the shape of said flow can be advantageously modified in its terminal portion before impacting onto the target preform, by increasing the dimension of said flow in a direction substantially perpendicular to the longitudinal axis of said target preform.

The modification of the geometry of the flow of glass particles is particularly easy and effective when applied onto a multi-flame burner with a. single flame-separating tube according to the present invention.

SUMMARY OF THE INVENTION

One aspect of the present invention thus relates to a multi-flame burner for manufacturing an optical fiber preform comprising:
- at least an inner section for generating an inner flame, said inner section comprising a first plurality of ducts through which at least a glass precursor material, a combustible gas and a combustion sustaining gas are flown; and
- at least an outer section for generating an outer flame surrounding said inner flame, said outer section comprising a second plurality of ducts through which at least a combustible gas and a combustion sustaining gas are flown; wherein
- an elongated hollow separating element made of a heat resistant material is disposed to surround said inner section and prolongs farther from the end of the ducts forming the outer section, in order to confine said inner flame and separate said inner flame from said outer flame.

Preferably, said first plurality of ducts disposed in the inner section of the burner is made from a metallic material. Advantageously, also the second plurality of ducts disposed in the outer section of the burner is made from a metallic material.

According to a preferred embodiment, a second elongated hollow element made of heat resistant material is disposed to surround the outer section of the burner for containing the outer flame.

Preferably, said inner and said outer section of the burner are of substantial circular form. Advantageously, said inner and said outer section of the burner are formed from a plurality of co-axial pipes made of metallic material.

According to a preferred embodiment, the separating element is an elongated pipe of a heat resistant material, preferably of quartz glass or ceramic material, such as alumina.

Preferably, said separating elongated hollow element extends for a length such as to surround the majority of the length of the reaction zone of the glass precursor material.

Preferably, said separating elongated hollow element extends for a length of about at least 80 mm from the tips of the ducts forming the inner section of the burner. Preferably, said separating elongated hollow element extends for a length of less than about 150 mm from the tips of the ducts forming the inner section of the burner.

According to an embodiment, the length of the ducts forming the inner and the outer section of the burner are substantially the same.

Advantageously, the inner section of the burner is spaced rearwardly of the outer section. Preferably, the pipes forming the outer section are from about 30 mm to about 80 mm longer than the pipes forming the inner section of the burner, more preferably from about 40 mm to about 65 mm.

According to a preferred embodiment, the elongated hollow element separating the two portion of the burner has an upper terminal portion which is formed into an elliptical cross-section.

A further aspect of the present invention relates to a method for manufacturing an optical preform by directing a flow of fine glass particles from a deposition burner onto a rotating elongated target preform, said method comprising the steps of:
- feeding said burner with a flow of a glass precursor material and directing said flow of glass precursor material towards said target preform;
- feeding said burner with a first flow of combustible gas and a first flow of combustion sustaining gas in order to generate an inner flame surrounding said flow of glass precursor material;
- feeding said burner with a second flow of combustible gas and a second flow of combustion sustaining gas in order to generate an outer flame surrounding said inner flame
- causing said glass precursor material to react in the presence of said flames, thus forming a flow of fine glass particles directed towards said target preform;

wherein said first flame is confined and separated from said second flame by an elongated hollow body disposed to surround said inner flame.

A further aspect of the present invention relates to a method for manufacturing an optical preform by directing a flow of fine glass particles from a multi-flame deposition burner comprising a plurality of ducts onto a rotating elongated target preform by using a multi-flame deposition burner as above described.

DESCRIPTION OF PREFERRED EMBODIMENTS

Figure 1:
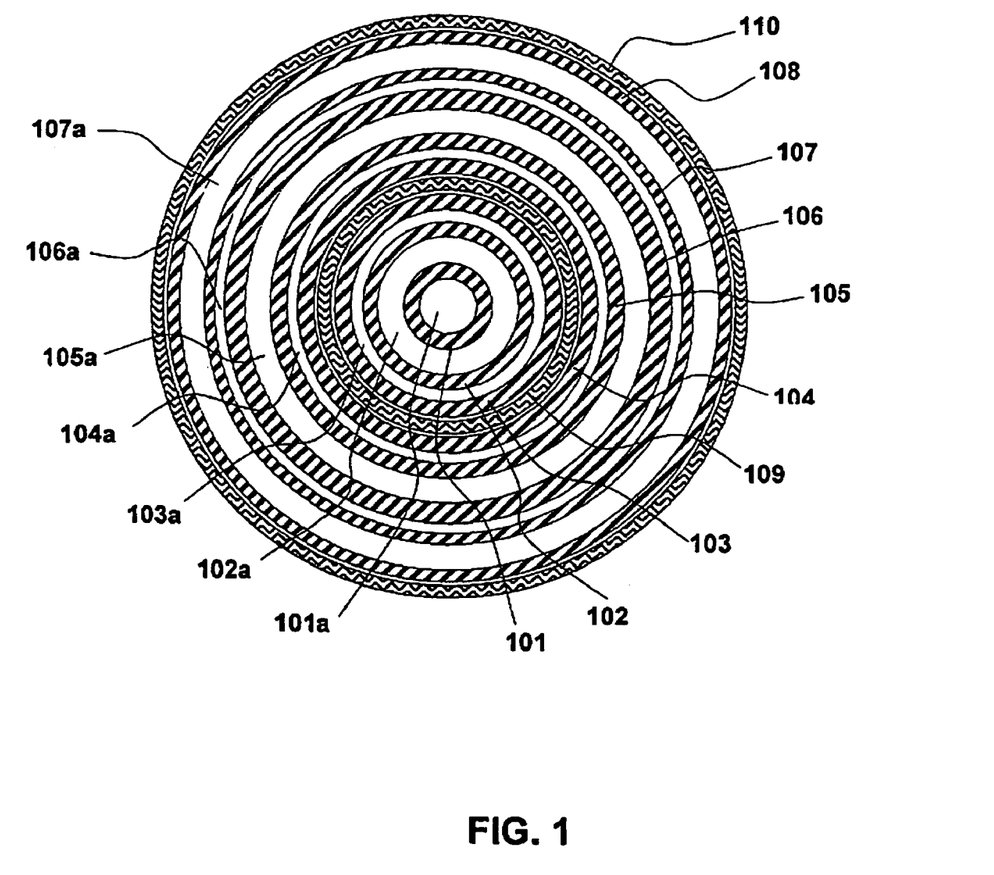
FIG. 1 shows a schematic transversal cross-sectional view of an embodiment of a burner according to the present invention.

FIG. 1 shows a schematic transversal cross-sectional view of an example of a burner according to an embodiment of the invention. In the specific, this embodiment illustrates a double-flame burner, particularly suitable for overcladding deposition.

The burner of FIG. 1 comprises seven openings 100a-107a through which the gases for forming the preform are passed.

Openings 101a-103a define the inner section of the burner, while openings 4a-7a define the outer section. The central opening 101a is delimited by the walls of a metal pipe 101, while the other annular openings are delimited by the respective outer and inner walls of metal pipes 101 to 108. The length of the metal pipes can be substantially the same, as shown in detail in FIG. 2, or the pipes defining the openings of the outer section can preferably be longer than the pipes defining the openings of the inner section, as shown in FIG. 3. However, in order to avoid excess overheating of the pipes forming the outer section, the length of said pipes shall preferably not exceed the length of the pipes of the inner section for more than about 80 mm, more preferably for more than about 60 mm.

The metal pipes are preferably made from an easily machinable and heat/corrosion resistant stainless steel. An example of a suitable metal material is AISI (American Institute Steel and Iron) 316L, which is a stainless steel comprising about 0.03% C about 16-18% of Cr, about 11.5%-14.5% of Ni, about 2% of Mn and about 2.5%-3% of Mo.

Typically, the inner pipe 101 has an inner diameter of from about 6 mm to about 8 mm and a thickness of from about 0.5 mm to about 2 mm.

The other metal pipes, having preferably a thickness comprised from about 0.5 mm to about 2.5 mm, are then arranged coaxially one to each other to form openings 102a-107a having widths of from about 1 mm to about 3.5 mm, depending on the relative diameter of the pipe and flow rate of gas through the aperture.

In particular, the width of each opening is selected according to the amount and kind of gas which is flown through said opening and to the relative radial position of said opening. For instance, in a burner particularly designed for the outer cladding deposition, openings through which inert gas is flown are dimensioned so to obtain an exit velocity of the gas of from about 0.1 and about 2 m/s. Said annular openings may thus have a width of from about 1 mm to about 1.5 mm. On the other side, openings through which combustion gases are flown are dimensioned so to obtain an exit velocity of the gas of from about 2 and about 10 m/s. Said annular openings may thus have a width of from about 2 mm to about 3.5 mm.

Figure 2:
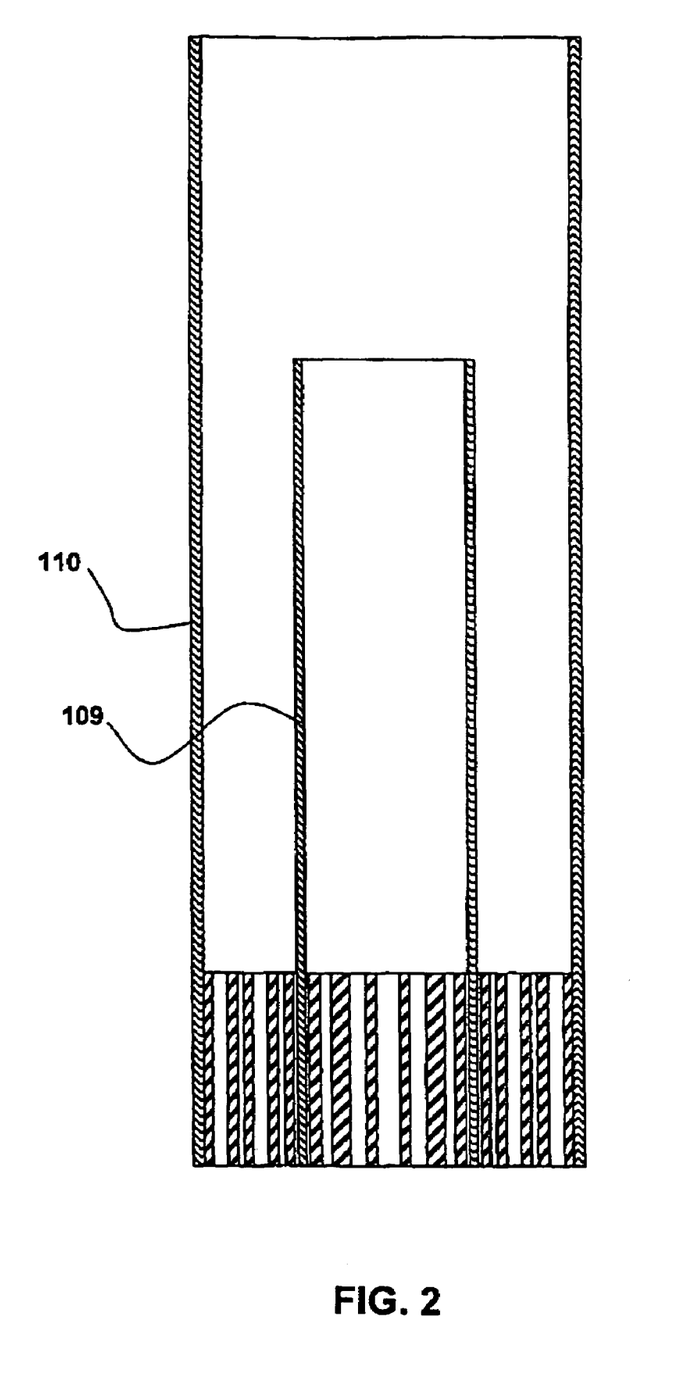
FIG. 2 shows a schematic longitudinal cross-sectional view of an embodiment of a burner according to FIG. 1.
Figure 3:
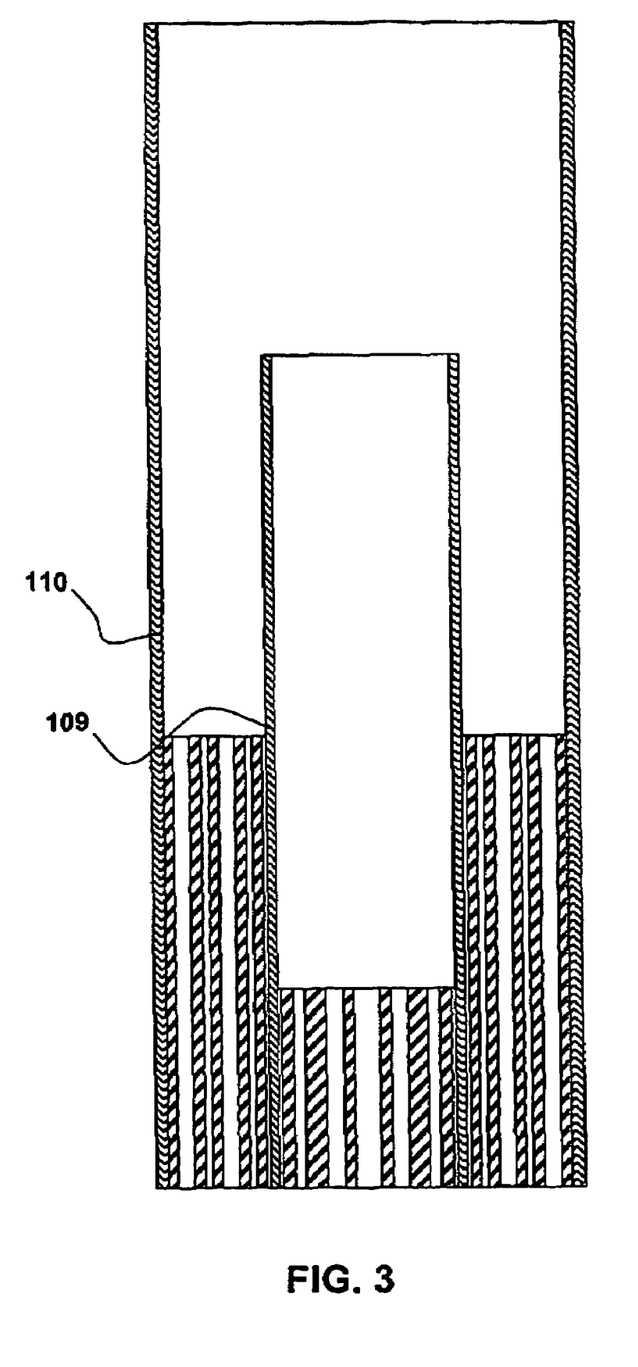
FIG. 3 shows a schematic transversal cross-sectional view of an alternative embodiment of a burner according to FIG. 1.

A separating tube 109 made from a heat resistant material, is disposed into the annular housing between pipes 103 and 104, said tube extending for a certain length farther from the tips of the pipes of the inner portion of the burner, as shown in FIGS. 2 and 3.

Tube 109 allows both to confine the inner flame for a certain length and to physically separate it from the outer flame. In addition, when the pipes forming the outer section of the burner are longer than the pipes forming the inner section, said tube 109 avoids a direct contact of the inner flame with the surface of the innermost metal pipe of the outer section.

A second tube 110, also made from heat resistant material, can be disposed externally to the metal pipe 108, extending for a certain length farther from the tips of the pipes of the outer portion of the burner, as shown in FIGS. 2 and 3, for confining the outer flame.

For the purposes of the present invention, the term "heat resistant material" is intended to refer to a material capable of resisting to temperatures typically present in a deposition burner during a preform manufacturing process, without undergoing to physical or chemical damages.

The heat resistant material of tubes 109 and 110 is for instance quartz glass or ceramic material, such as alumina. Preferably quartz, in particular high purity quartz, is employed.

Preferably, the separating tube 109 extends for a length such to surround the majority of the length of the reaction zone where the glass precursor material reacts to form the glass particles.

Methods for approximately calculating the extension of the reaction zone are well known and widely discussed in several reference books, such as K. K. Kuo, "Principles of Combustion", Wiley and Sons Ed., New York. 1986, p. 370.

An example of such calculation is given hereinafter, with specific reference to a burner having the following configuration:

a central duct through which $SiCl_4$ as glass precursor material is flown;

a first annular duct (surrounding said central duct) through which hydrogen is flown; and a second annular duct, surrounding said first annular duct, through which oxygen (in stoichometric excess with respect to hydrogen) is flown.

As an approximation, it is assumed that all the hydrogen instantaneously reacts with oxygen at the outlet of the ducts. A flow of water and oxygen, surrounding the central flow of silicon tetrachloride, is thus formed. The glass precursor material reacts with the formed water to form silica, according to the following reaction:

$$SiCl_4 + 2H_2O \rightarrow SiO_2 + 4HCl$$

The length of the reaction zone can thus be calculated by applying the following relationship:

$$L = \frac{3}{8\pi} \frac{1}{f_{st}} \frac{\pi r_0^2 u_o}{\upsilon}$$

where
$r_0$ is the diameter of the outlet of the central duct;
$u_0$ is the velocity of the flow of silicon tetrachloride;
$\upsilon_0$ is the viscosity of the reacting mixture; and $$f_{st} = \frac{(F/O)_{st} Y_{O,A}}{1 + (F/O)_{st} Y_{O,A}}$$

where

F/O is the mass ratio of silicon tetrachloride and water under stoichometric reaction conditions; and $Y_{O,A}$ is the mass fraction of water in the oxygen+water flow.

The separating tube may thus preferably have a length substantially equivalent to the calculated length of the reaction zone. Said tube may be up to about 50-60% longer than said calculated length. Longer lengths of the tube, e.g. 60% or more with respect to the calculated length of the reaction zone (in particular more than about 70%), while not substantially increasing the deposition rate of the burner, may conversely negatively affect the deposition process. For instance, if the separating tube is excessively long and the burner is kept too close to the target preform, the deposited soot can be subjected to undesirable local overheating, with consequent formation of cracks in the soot. On the other side, if the burner is too spaced from the preform in order to avoid the above overheating drawbacks, an irregular growth of the silica glass particles may occur, with consequent reduction of the deposition rate.

Thus, particularly for overcladding burners, depending from the dimensions of the ducts and the flow rate and velocity of the gases flowing therethrough, the Applicant has determined that the separating tube 109 should preferably extend for at least about 80 mm from the tips of the pipes of the inner section of the burner. The length of the tube should however preferably not exceed about 150 mm. Preferably, said length is from about 90 to about 130 mm. When the pipes forming the inner section of the burner are spaced rearwardly with respect to the pipes of the outer section, the separating tube preferably extends for at least about 40 mm from the tips of the pipes of the outer section, more preferably for at least 50 mm, up to about e.g. 100 mm, preferably 85 mm.

The outer tube 110 preferably extends for about 150 mm to about 220 mm from the tips of the pipes of the outer section.

Advantageously, the metallic coaxial pipes are first assembled together to form the burner, leaving a suitable annular clearance between two neighbouring pipes, said clearance being apt to receive the separating quartz tube 109. The separating tube 109 can thus be inserted into and (if necessary) removed from said annular clearance with a rather simple operation. Similarly, the outer glass tube 110 can be fitted on (and removed from) the outer surface of the outer metal pipe (suitably adapted for receiving said glass tube), after the metal pipes of the burner have been assembled together.

With the above construction, the size and concentricity of the metal co-axial pipes forming the burner can be controlled much more easier than in conventional multi-flame burners where the co-axial pipes are made from quartz glass. In addition, the manufacturing, handling and maintenance of such burner can be performed in a rather simple manner, without the risk of breaking the pipes. Only a single glass tube is used for confining the inner flame and separating it from the outer one, which tube can be easily fitted into the burner after the whole burner has been assembled and (if necessary) removed from it, for instance in case of accidental breakage of the same.

Although the heat resistant materials from which tubes 109 and 110 are made can withstand rather easily the typical temperatures developed by the flames of the burner, it may be desirable to reduce the heat transmitted from the flames towards the surfaces of the heat resistant tubes.

Thus, in order to lower the heat transmitted from the flames towards the surfaces of heat resistant tubes 109 and 110, a gas is preferably allowed to flow along the internal and/or external walls of tube 109 and preferably also along the internal wall of tube 110, to create a boundary layer on the respective surfaces of the tubes. The presence of such boundary layer may in fact contribute to dissipate the heat generated by the flames, thus avoiding possible overheating of the tubes. Preferably, said boundary layer is formed by a laminar flow of gas. To this end, any gas capable of forming said boundary layer at the relevant flow rates applied during the deposition operations can be employed. Preferably, oxygen or inert gases, such as argon, helium or nitrogen, are employed.

Typically, the central duct 101 of a multi-flame burner according to the present invention is fed with a flow of glass precursor material, optionally admixed with a high thermal diffusivity gas. In the present description, the term glass precursor material is intended to refer to any suitable material capable of reacting in the presence of an oxidizing flame to form glass (pure silica) or doped glass particles. Preferably, silicon tetrachloride ($SiCl_4$) can be used. Alternatively, other silicon containing reactants can be used, such as $SiHCl_3$, $SiH_2Cl_2$, $SiH_3Cl$ or $SiH_4$. In addition chlorine-free silicon containing reactants can be used, such as the siloxane compounds disclosed in U.S. Pat. No. 5,043,002, e.g. octamethylcyclotetrasiloxane, or the organosilicone compounds disclosed in European Patent Application Publ. No. EP 1,016, 635, e.g. hexamethyldisilane.

A preferred glass precursor material capable of forming doped glass particles under the reaction conditions of a flame burner according to the invention is GeCl4) Germanium tetrachloride. Alternative dopant materials are $POCl_3$ or $BBr_3$.

Mixtures of the above glass precursor materials (e.g. $SiCl_4$ and $GeCl_4$) in variable proportion can be used to suitably modify the refractive index of the produced preform.

As the above glass precursor materials are generally liquid at ambient temperature, they may be fed as liquids to the metal pipes of the burner or they may be preferably vaporized in advance, so that high temperature vapors of the glass precursor material are flown through the central pipe of the burner.

As previously mentioned it may be advantageous, in particular for relatively large dimension burners (e.g. cladding burners), to add a predetermined amount of a high thermal diffusivity gas to the flow of glass precursor material, in order to increase the heat transfer from the flame towards the inner core of said flow.

The thermal diffusivity of a gas is defined as the ratio of the thermal conductivity to the heat capacity. It measures the ability of a material to conduct thermal energy relative to its ability to store thermal energy. Typical values of thermal diffusivity of gases can be found on a number of reference books, such as R. B. Bird, "Transport Phenomena", Wiley & Sons, New York 1960, or F. P. Incropera, D. P. DeWitt, "Fundamentals of heat and mass Transfer", Wiley and Sons; 3rd edition, New York, 1996.

For the purposes of the present invention, a high thermal diffusivity gas is a gas having a thermal diffusivity of at least $3.0 \cdot 10^{-5}$ $m^2/s$ or higher, e.g. up to about $2.0 \cdot 10^{-4}$ $m^2/s$ (values at 400° K.). Examples of suitable high thermal diffusivity gases are oxygen, nitrogen, argon, helium or hydrogen, having a thermal diffusivity at 400° K. of $3.6 \cdot 10^{-5}$ $m^2/s$, $3.7 \cdot 10^{-5}$ $m^2/s$, $3.8 \cdot 10^{-5}$ $m^2/s$, $3.0 \cdot 10^{-4}$. $m^2/s$ and $2.3 \cdot 10^{-4}$ $m^2/s$, respectively.

As the thermal diffusivity of a gas depends, further from its specific thermal diffusivity coefficient, also from the mass fraction of the added gas, it is preferable to use gases with a higher molecular weight, in order to reduce the volume fraction of added gas (or, alternatively, using the same volume fraction of gas, increase its mass fraction). Oxygen is thus preferred for its higher molecular weight and for its relatively high coefficient of thermal diffusivity.

Said high thermal diffusivity gas should preferably be added to the flow of glass precursor material in an amount such that the overall thermal diffusivity of the so obtained mixture is about 50% higher than the thermal diffusivity of the glass precursor material. In particular, when silicon tetrachloride is used, the thermal diffusivity of the mixture should preferably be higher than about $4.0 \cdot 10^{-6}$ m$^2$/s at 400° K. Preferably, the thermal diffusivity of the mixture is comprised between $4.0 \cdot 10^{-6}$ m$^2$/s and $5.5 \cdot 10^{-6}$ m$^2$/s at 400° K.

The high thermal diffusivity gas is preferably admixed in a volume fraction of from about 0.05 to about 0.5 parts with respect to the total volume of the mixture, preferably of from about 0.1 to about 0.4 parts, depending also from the thermal diffusivity of the glass precursor material (e.g. $2.84 \cdot 10^{-6}$ m$^2$/s at 400° K. for SiCl$_4$).

A combustible gas and a combustion sustaining gas are then flown through the annular ducts of the burner formed by the co-axial metal pipes, optionally together with an inert gas. Examples of suitable combustible gas are hydrogen or hydrocarbons, such as methane. Oxygen is typically used as the combustion sustaining gas.

If desired, an inert gas may be flown through the annular ducts, either alone or admixed with the above combustible gas or combustion sustaining gas. For instance, an inert gas may be flown through an annular duct disposed between a first annular duct dedicated to the inlet of a combustible gas and a second annular duct dedicated to the inlet of a combustion sustaining gas. This allows a physical separation of the two flows of combustible gas and of combustion sustaining gas, thus displacing the flame away from the tips of the metal pipes and avoiding possible overheating of the same. Similarly, the flame can be displaced away from the tips of the metal pipes by suitably increasing the inlet speed of the combustible gas and of combustion sustaining gas. Examples of suitable inert gases are argon, helium, nitrogen.

With specific reference to FIG. 1, the glass precursor material, e.g. silicon tetrachloride, preferably admixed with oxygen, is flown through the central opening 101a, hydrogen through opening 102a and oxygen through opening 103a of the inner section of the burner. The flows of hydrogen and oxygen are maintained at a sufficiently high rate in order to slightly move the flame away from the tips of the metal pipes. Oxygen is preferably kept in a relatively high stoichometric excess with respect to hydrogen, the O$_2$/H$_2$ molar ratio being preferably of from about 1.8:1 to about 3:1.

Said excess of oxygen allows to obtain a convergent flame and to create an oxygen boundary layer on the inner surface of the quartz tube 109, for reducing the heat transferred onto the quartz tube. For determining the excess of oxygen in the inner flame, also the possible reaction of said oxygen with the hydrogen flowing from the outer section of the burner shall be taken into account. In order to effectively create said boundary layer, the Applicant has observed that the inlet speed of the oxygen gas into the burner should preferably be of at least 3.0 m/s or higher, e.g. up to about 10.0 m/s.

In the outer section of the burner, argon is flown through opening 104a, hydrogen through opening 105a, argon through opening 106a and oxygen through opening 107a. In this case, oxygen is flown in a stoichometric ratio or preferably in slight excess with respect to hydrogen, the O$_2$/H$_2$ molar ratio being from about 1:2 to about 1:1 preferably from about 1:1.95 to about 1:1.75.

As previously mentioned, the hydrogen flowing from the outer section may also partially react with the excess of oxygen flowing from the inner section of the burner.

Figure 4:
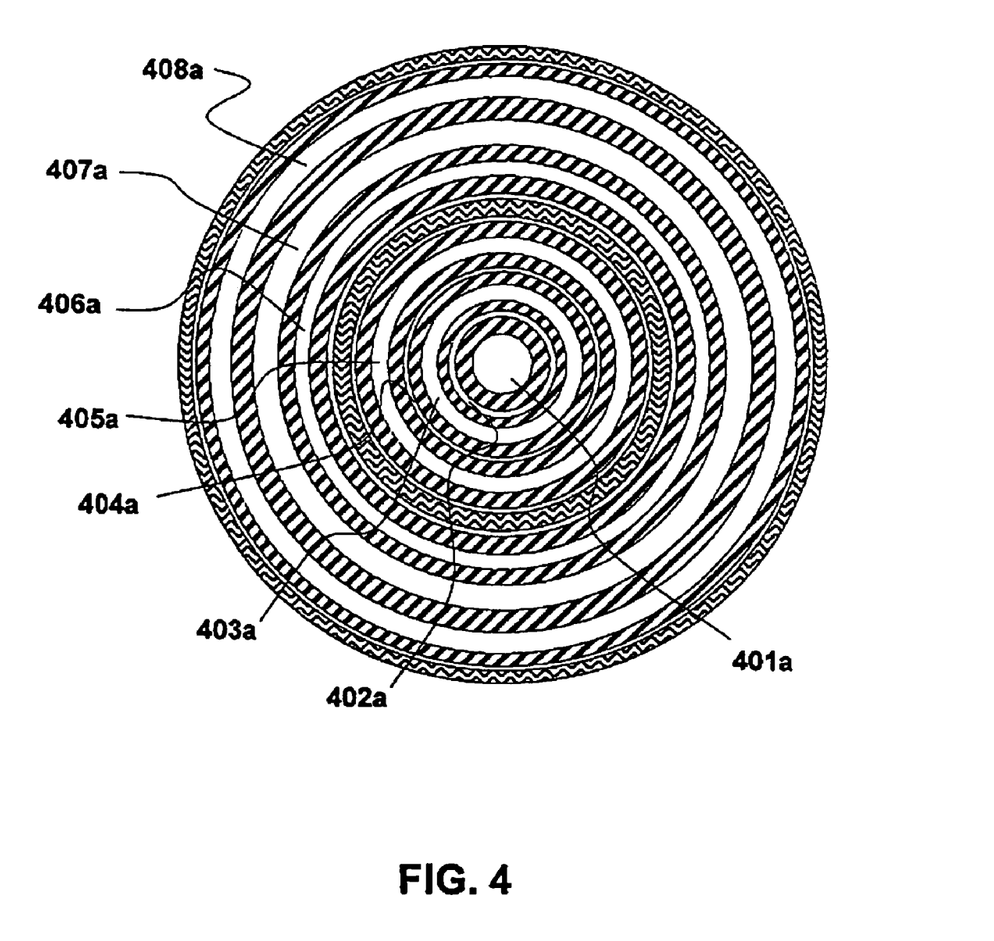
FIG. 4 shows a schematic transversal cross-sectional view of an alternative embodiment of a burner according to the present invention.

According to an alternative configuration shown in FIG. 4, the glass precursor material, e.g. silicon tetrachloride, preferably admixed with oxygen, is flown through the central opening 401a, argon through opening 402a, hydrogen through opening 403a, argon through opening 404a and oxygen through opening 405a of the inner section of the burner. In this case, the interposition of an argon's flow between oxygen's and hydrogen's flows allows the flame to be displaced away from the tips of the metal pipes. As previously mentioned, oxygen flowing through opening 405a is preferably kept in a relatively high stoichometric excess with respect hydrogen. In the outer section of the burner, argon is flown through opening 406a, a mixture of hydrogen and argon is flown through opening 407a, and oxygen through opening 408a. Premixing argon with hydrogen increases the momentum of the mixture containing combustible gas. This is useful for directing the flow of combustion products toward the target soot and also for lifting the flame from burner orifices.

The Applicant has further observed that by suitably redistributing the flow of forming glass particles before said flow impacts onto the target preform, it is possible to further increase the deposition rate of the burner. To this end, a multi-flame burner as disclosed previously is particularly suitable. In particular, the outlet of the quartz separating tube is suitably modified so to increase the deposition rate of the burner. The modification is such as to confer to the outlet of the quartz separating tube a cross-section having a major and a minor axis.

As a matter of fact, the Applicant has observed that for obtaining an optimal and homogeneous heating of the reacting glass precursor material, both the stream of glass precursor material and the surrounding inner flame shall preferably have a substantially circular geometry. On the other side, it has been observed that the deposition rate can be increased by increasing the dimensions of the flow of glass particles in a direction substantially perpendicular with respect to the longitudinal axis of the target preform.

Figure 5:
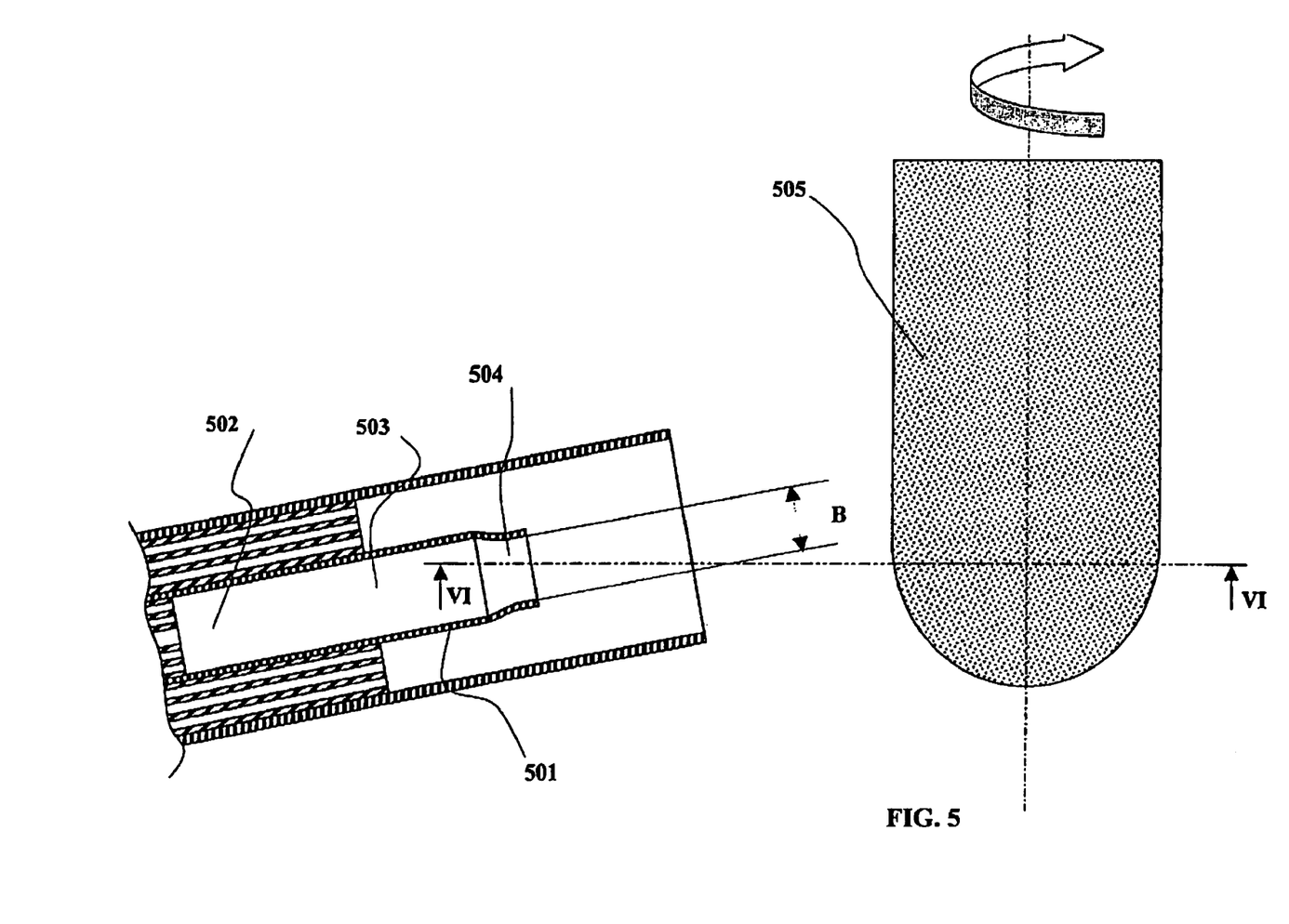
FIG. 5 shows a longitudinal cross-sectional view of a preferred embodiment of a burner according to the present invention.

FIG. 5 show a schematic longitudinal cross-sectional view of a burner with a modified glass quartz tube 501 according to the present invention, and the relative target preform 505 (not in scale).

Figure 6:
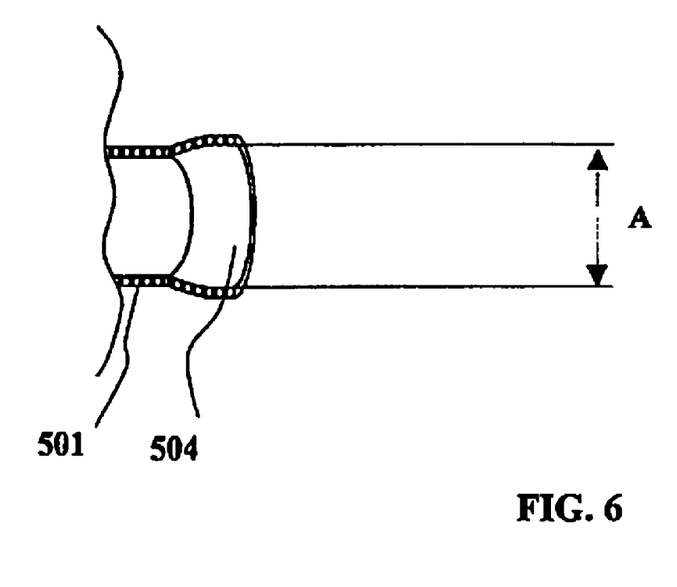
FIG. 6 is a section according to line VI-VI of FIG. 5.

FIG. 6 is a section according to plane VI-VI of FIG. 5, showing the longitudinal cross-section of the terminal portion of the modified quartz glass tube 501 and of the relative target preform.

As shown in FIG. 5, the quartz glass tube 501 confining the inner flame has preferably a substantially circular cross-section in its initial portion 502, i.e. in the proximity of the metal co-axial pipes, and preferably in its middle portion 503, for causing an optimal and homogeneous heating of the reacting glass precursor material. The confining quartz glass tube 501 is then suitably modified in correspondence with its terminal portion 504, in order to confer a substantially elliptical cross section to the flow of glass particles and to the surrounding flame, with a major axis "A" (see FIG. 6) and a minor axis "B". Other suitable forms having a major and minor axis (e.g. rectangular) can be applied to the outlet of the glass tube. As observed by the Applicant, the deposition rate of a burner can be increased by disposing said confining quartz glass tube such that the major axis "A" of the elliptic flow lays on a plane which is substantially perpendicular to the longitudinal axis of the preform.

This redistribution of the stream of growing silica particles results in an increase of the deposition rate of the burner.

In order to effectively increase the deposition rate of the burner, the ratio between the major axis and the minor axis shall preferably be at least about 1.2 or higher. On the other side, in order to avoid an excessive modification of the geometry of the flow of glass particles (which may cause undesired turbulences in the flows of the burner) said ratio is preferably kept lower than about 2.5. Preferably, said ratio is from about 1.25 to about 1.8.

In addition, said major axis should be relatively smaller with respect to the initial diameter of the growing preform, in order to avoid excessive dispersion of silica particles. Preferably, said major axis is in a ratio of at least about 1:2 or higher with respect to the initial diameter of the growing preform, more preferably of at least about 1:2.5 or higher. On the other side, said major axis should be sufficiently large with respect to the final diameter of the preform, in order to effectively increase the deposition rate of the process.

In particular, the ratio between said major axis and the final diameter of the preform is preferably lower than about 1:7, preferably lower than about 1:6.

Figure 7:
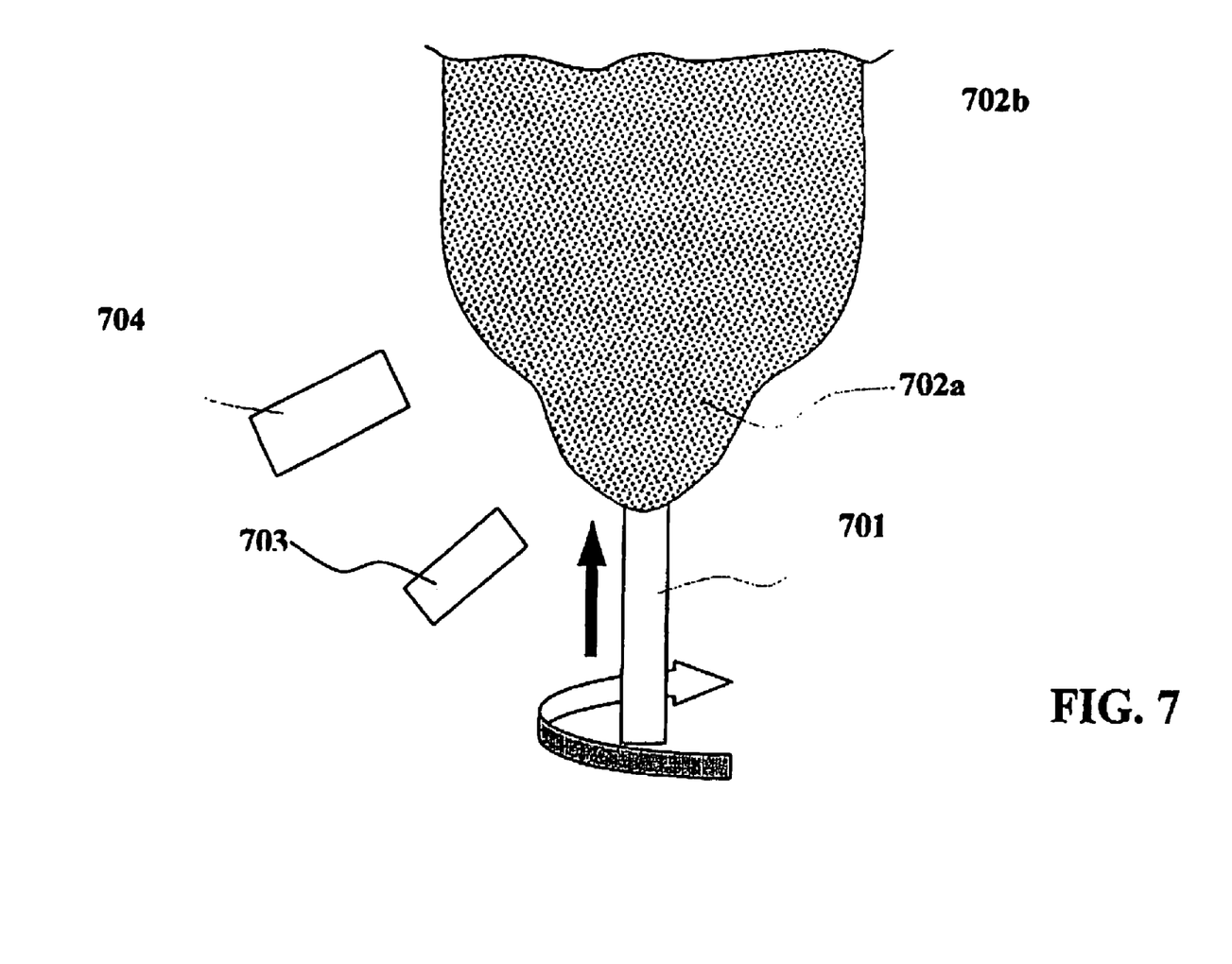
FIG. 7 schematically shows an overcladding deposition process according to the present invention.

For instance, in a double burner overcladding deposition process as illustrated in FIG. 7, where the upper burner 704 starts the deposition on a growing preform of about 90-100 mm diameter and increases the diameter of said preform up to about 180-200 mm, the cross-sectional dimensions of the separating quartz tube may be the following:

Circular section: diameter about 31 mm

Elliptical section: major axis about 34 mm; minor axis about 24.5 mm.

The burner of the present invention is particularly suitable for being used in the overcladding deposition of large diameter preforms, where the flow rate of the glass precursor material is typically kept higher than about 8 slm (standard liter per minute), in particular at about 10 slm or higher.

FIG. 7 schematically illustrates a typical overcladding deposition process for embodying the method of the present invention. The deposition typically starts onto a glass rod 701 of about 20 mm diameter, comprising the core of the preform and a first portion of the cladding layer, separately manufactured according to conventional techniques. The target preform is rotated about is longitudinal axis and slowly upwardly translated. A lower overcladding burner 703 deposits a first portion of overcladding layer 702a, e.g. up to a diameter of about 90-100 mm onto the preform. An upper burner 704 then completes the deposition by depositing a second overcladding layer 702b, e.g. increasing the diameter of the deposited soot at about 180-200 mm. Typically, the upper burner 704 has increased dimensions with respect to the lower one, in order to allow the deposition of higher amount of silica particles in the time unit. These dimensions correspond substantially to the dimensions mentioned in connection with the burner illustrated in FIGS. 1-4.

The so obtained preform is then heated into a furnace and collapsed to obtained a final preform of about 60-80 mm diameter, which is then drawn into an optical fiber according to conventional techniques.

While a burner according to the present invention can advantageously be used in the above process for depositing the overcladding layer of the preform, in particular the outer overcladding portion (i.e. as burner 704), it will be appreciated that such a burner, when suitably dimensioned, can also be used for the deposition of the core and of the inner portion of the cladding.

EXAMPLE 1

Effects of Flame Confining Quartz Tube

For this experiment, a burner comprising eight co-axial metal pipes as shown in FIGS. 1 and 2 has been used. The material used for the metal pipes was AISI316L stainless steel. Pipes 101-108 and ducts 10a-107a of FIG. 1 will be referred to in the present example as pipes 1-8 and ducts 1a-7a, respectively.

A quartz glass tube has been inserted between the third and the fourth metal pipe for providing the flame confinement. The following table 1 indicates the relative internal (ID) and outer (OD) diameter of the annular ducts determined by the metal pipes; for the innermost duct 1a, having a circular cross section, only the OD has been reported. The inner section of the burner is formed by pipes 1 to 3 (and corresponding ducts 1a to 3a), while the outer section of the burner is formed by pipes 4 to 8 (and corresponding ducts 4a to 7a)

TABLE 1 dimensions of ducts

| | Duct no. | | | | | | |
|---|---|---|---|---|---|---|---|
| | 1a | 2a | 3a | 4a | 5a | 6a | 7a |
| ID (mm) | — | 11 | 21.34 | 37.6 | 44.2 | 55.8 | 61.1 |
| OD (mm) | 7 | 17.6 | 24.4 | 40.2 | 50.5 | 58.3 | 67.55 |

The internal confining quartz glass tube, having a thickness of about 1.5 mm, an inner diameter of 28.4 mm and an outer diameter of 31.4, has been inserted into the annular clearance between pipes 3 and 4 (ID 27.4 mm, OD 33.6 mm). The lower portion of the glass tube has been wrapped with a Teflon® tape up to the outer diameter of the clearance, in order to maintain it in a fixed position.

An outer quartz glass tube having a thickness of about 2 mm has been further disposed around the outer metal pipe 8.

As shown in FIG. 2, all the metal pipes were substantially of the same length. The outer quartz tube protruded for about 165 mm from the tips of the metal pipes, while the length of the internal quartz tube has been varied, as shown in table 3.

The reactants employed and their relative flow rate and inlet speed are reported in the following table 2, where the innermost opening of the burner is identified with no. 1a. Silica tetrachloride has been supplied by vaporizing the liquid material and feeding it at a temperature of about 80° C. through the central pipe, together with oxygen.

TABLE 2

Reactants and flow rate

| | Duct no. | | | | | | |
|---|---|---|---|---|---|---|---|
| | 1a | 2a | 3a | 4a | 5a | 6a | 7a |
| Reactant | $SiCl_4 + O_2$ | $H_2$ | $O_2$ | Ar | $H_2$ | Ar | $O_2$ |
| Flow Rate (slm) | 12 + 7 | 27 | 65 | 14 | 160 | 10 | 115 |
| Inlet velocity (m/s) | 8.2 | 3.4 | 9.9 | 1.5 | 5.7 | 0.7 | 2.9 |

Under these conditions, a theoretical length of the reaction zone of about 100-120 mm has been calculated, according to the relationship previously illustrated.

The target preform was a rotating quartz tube of about 90 mm diameter and the burner (i.e. the upper end of the outer glass tube of the burner) has been kept at a distance of about 50 mm from the preform, with an inclination of about 12° with respect to the longitudinal axis of the preform.

The preform was translated upwardly at a speed of 168 mm/h and rotated at about 60 r.p.m.

The deposition was stopped when the preform reached a diameter of about 140-150 mm.

By increasing the protruding length of the inner confining quartz tube from the tips of the metal pipes, an increase in the deposition rate has been observed, as reported in the following table 3. The deposition rate reported in table 3 is normalized with respect to the deposition rate of a burner without separating quartz tube (length 0 mm).

TABLE 3

Deposition rate

| Tube protruding length (mm) | Normalized deposition rate |
|---|---|
| 0 | 1 |
| 10 | 1.24 |
| 27 | 1.47 |
| 47 | 1.56 |
| 67 | 1.70 |
| 87 | 1.74 |
| 107 | 1.77 |
| 127 | 1.79 |

From the results reported in the above table 3, it can be observed that a tube with a length of 87-107 mm provides a substantial increase in the deposition rate. When using the longer tube (127 mm), although a slight increase in the deposition rate has still been observed, the resulting preform showed cracks in the deposited soot, which indicates a not appropriate density value. This is possibly caused by the fact that the outlet of the separating tube was positioned too close to the target preform, thus concentrating the inner flame onto a too small surface of the preform.

Some other experiments have thus been carried out by positioning the burner further 40 mm away from the target soot, and the recipe has been maintained as per table 2. Corresponding to three different separating tube lengths of 107, 133 and 153 mm, the obtained normalised deposition rates were 1.81, 1.89 and 1.83, respectively.

At the end of the deposition process, no damages or deformation have been observed onto the metal pipes forming the outer flame of the burner.

EXAMPLE 2

Modification of the Cross-Section of the Separating Quartz Tube

For this experiment a burner having a configuration according to FIG. 4 has been used. Pipes 401-409 and ducts 401a-408a of FIG. 1 will be referred to in the present example as pipes 1-9 and ducts 1a-8a, respectively.

Dimensions of ducts created by pipes 1-9 and the relative flow of materials is reported in tables 4 and 5, respectively.

TABLE 4

Dimensions of the burner

| | Duct No | | | | | | | |
|---|---|---|---|---|---|---|---|---|
| | 1a | 2a | 3a | 4a | 5a | 6a | 7a | 8a |
| ID (mm) | 0 | 8 | 10 | 18 | 20 | 32.4 | 39 | 50 |
| OD (mm) | 7 | 9 | 17 | 19 | 27 | 37 | 48 | 55 |

TABLE 5

Flow of reactants

| | Duct No | | | | | | | |
|---|---|---|---|---|---|---|---|---|
| | 1a | 2a | 3a | 4a | 5a | 6a | 7a | 8a |
| Reactant | $SiCl_4 + O_2$ | Ar | $H_2$ | Ar | $O_2$ | Ar | $H_2 + Ar$ | $O_2$ |
| Flow Rate (slm) | 11 + 3 | 0.8 | 22 | 1.6 | 50 | 10 | 118 + 21 | 60 |

The internal separating quartz glass tube, having a thickness of about 1.5 mm, has been inserted into the annular clearance between pipes 5 and 6.

An outer quartz glass tube having a thickness of about 2 mm has been further disposed around tube the outer metal pipe 9.

In this experiment, the tips of pipes 6 to 9, forming the outer section of the burner, were spaced forwardly of about 53 mm from the tips of the pipes 1 to 5, forming the inner section of the burner.

The inner quartz separating tube was prolonged for about 70 mm from the tips of the pipes of the outer section, having thus a total length of about 123 mm from the tips of the pipes of the inner section.

The target preform was a rotating quartz tube of about 90 mm diameter and the burner has been kept at a distance of about 90 mm from the preform, with an inclination of about 12° with respect to the longitudinal axis of the preform.

The preform was translated upwardly at a speed of 168 mm/hr and rotated at about 60 r.p.m.

The deposition was stopped when the preform reached a diameter of about 140-150 mm.

The above burner has then been modified by conferring an elliptical cross-section to the terminal portion of the separating quartz tube, as shown in FIGS. 5 and 6. The section has been changed from circular into elliptical at about 10 mm from the end of the tube, by maintaining substantially unaltered the fluid passage area of the tube. The major axis of the internal elliptical cross-section at the outlet of the tube was of about 34 mm, while the minor axis was of about 24.6 mm.

The burner has then been positioned similarly to the previous test, with the major axis of the elliptical cross-section of the quartz tube laying on a plane substantially perpendicular to the longitudinal axis of the target preform. The process conditions were as previously described.

A normalized deposition rate (with respect to the value obtained with the circular cross-section burner) of about 1.08 was obtained.

As a comparative experiment, the above burner has been rotated of 90° with respect to its own longitudinal axis, so to exchange the relative positions of the major and of the minor axis. In this case, a deposition rate of about 0.76.

As shown by the above results, it is thus possible to increase the deposition rate of a burner according to the invention by suitably modifying the cross-section of the outlet of the separating quartz tube.

What is claimed is:

1. A method for manufacturing an optical preform by directing a flow of fine glass particles from a deposition burner onto a rotating elongated target preform, said method comprising the steps of:
   (a) feeding said burner with a flow of a glass precursor material via a first plurality of ducts and directing said flow of glass precursor material toward said target preform;
   (b) feeding said burner with a first flow of combustible gas and a first flow of combustion sustaining gas via said first plurality of ducts in order to generate an inner flame surrounding said flow of glass precursor material;
   (c) feeding said burner with a second flow of combustible gas and a second flow of combustion sustaining gas via a second plurality of ducts in order to generate an outer flame surrounding said inner flame;
   (d) reacting said glass precursor material in the presence of said flames, thus forming a flow of fine glass particles directed toward said target preform; and
   (e) confining and separating said inner flame from said outer flame with an elongated hollow separating element made of a heat resistant material that surrounds said inner flame and that does not form a part of a duct for the passage of any gas or glass precursor material.

2. A method according to claim 1, wherein said elongated hollow separating element has a length greater than the length of said first plurality of ducts.

3. A method according to claim 1, wherein said elongated hollow separating element has a length greater than the length of said second plurality of ducts.

4. A method according to claim 1, further comprising the step of confining said outer flame with a second elongated hollow separating element made of a heat resistant material that surrounds said outer flame and does not form a part of said second plurality of ducts.

5. A method according to claim 1, further comprising the step of assembling said first plurality of ducts and said second plurality of ducts so as to leave a clearance to receive said elongated hollow separating element.

* * * * *